(12) United States Patent
Kreutzkämper et al.

(10) Patent No.: US 12,196,366 B2
(45) Date of Patent: Jan. 14, 2025

(54) PROGRESSIVE DISTRIBUTOR

(71) Applicant: SKF Lubrication Systems Germany GmbH, Walldorf (DE)

(72) Inventors: Jürgen Kreutzkämper, Waibstadt-Daisbach (DE); Andreas Schönfeld; Dennis Zahn, Karlsdorf-Neuthard (DE)

(73) Assignee: SKF Lubrication Systems Germany GmbH, Walldorf (DE)

( * ) Notice: Subject to any disclaimer, the term of this patent is extended or adjusted under 35 U.S.C. 154(b) by 0 days.

(21) Appl. No.: 18/546,722

(22) PCT Filed: Feb. 14, 2022

(86) PCT No.: PCT/EP2022/053503
§ 371 (c)(1),
(2) Date: Aug. 16, 2023

(87) PCT Pub. No.: WO2022/179874
PCT Pub. Date: Sep. 1, 2022

(65) Prior Publication Data
US 2024/0133517 A1  Apr. 25, 2024
US 2024/0230027 A9  Jul. 11, 2024

(30) Foreign Application Priority Data

Feb. 23, 2021 (DE) .......................... 102021104272.0

(51) Int. Cl.
F16N 25/02 (2006.01)
(52) U.S. Cl.
CPC .................... F16N 25/02 (2013.01)
(58) Field of Classification Search
CPC .................. F16N 25/00; F16N 25/02
(Continued)

(56) References Cited

U.S. PATENT DOCUMENTS

RE21,236 E * 2/1939 Hillis ...................... F16N 25/02
184/6
2,146,424 A * 2/1939 Dirkes ..................... F16N 25/02
184/7.4
(Continued)

FOREIGN PATENT DOCUMENTS

CN   202012717 U   10/2011
CN   107869646 A    4/2018
CN   209068149 U    7/2019

OTHER PUBLICATIONS

International Search Report and Written Opinion of the European Patent Office in PCT Application No. PCT/EP2022/053503, dated May 13, 2022; 11pgs.

*Primary Examiner* — Henry Y Liu
(74) *Attorney, Agent, or Firm* — Stinson LLP

(57) ABSTRACT

A progressive distributor for lubricant includes a housing block. The housing block includes a lubricant inlet bore, via which receives lubricant, and a plurality of lubricant outlets, via which a metered amount of lubricant is dispensable. A plurality of metering pistons are provided in the housing block for the dispensing of the metered amount of lubricant. The metering pistons are received in associated piston bores. Each piston bore is associated with two lubricant outlets. Each metering piston is displaceable in the piston bore and is configured to alternatingly dispense the metered amount of lubricant to the one or the other lubricant outlet. The piston bores are fluidically connected to the lubricant-inlet bore and to each other via connecting bores to transfer lubricant to the other piston bores. The piston bore includes a first region configured to receive the metering piston and a second region configured as the lubricant outlet.

19 Claims, 2 Drawing Sheets

(58) Field of Classification Search
USPC .................................................. 184/6.28, 7.4
See application file for complete search history.

(56) References Cited

U.S. PATENT DOCUMENTS

| | | | | | |
|---|---|---|---|---|---|
| 2,183,986 | A * | 12/1939 | Corey | ..................... | F16N 25/02 184/7.4 |
| 2,269,928 | A * | 1/1942 | Dirkes | ..................... | F16N 25/02 184/7.4 |
| 2,300,330 | A * | 10/1942 | Acker | ..................... | F16N 25/02 184/7.4 |
| 2,440,410 | A * | 4/1948 | Leonard | ................... | F16N 25/02 222/137 |
| 2,718,281 | A * | 9/1955 | Harter | ..................... | F16N 25/02 184/7.4 |
| 2,792,911 | A * | 5/1957 | Harter | ..................... | F16N 25/02 184/7.4 |
| 2,834,433 | A * | 5/1958 | Higgens | .................. | F16N 25/02 184/7.4 |
| 2,937,716 | A * | 5/1960 | Schlosshauer | .......... | F16N 25/02 184/7.4 |
| 3,024,869 | A * | 3/1962 | Akamatsu | ............... | F16N 25/02 184/7.4 |
| 3,086,614 | A * | 4/1963 | Sensui | ..................... | F16N 25/02 184/7.4 |
| 3,219,146 | A * | 11/1965 | Leese | ..................... | F16N 25/02 184/6 |
| 3,229,786 | A * | 1/1966 | Robson | ................... | F16N 25/02 184/7.4 |
| 3,298,460 | A * | 1/1967 | Porter | ..................... | F16N 25/02 137/271 |
| 3,337,003 | A * | 8/1967 | Acker | ..................... | F16N 25/02 184/7.4 |
| 3,409,104 | A * | 11/1968 | Acker | ..................... | F16N 25/02 184/7.4 |
| 3,414,085 | A * | 12/1968 | Fujita | ..................... | F16N 25/02 184/7.4 |
| 3,459,278 | A * | 8/1969 | Callahan | ................. | F16N 25/02 184/6 |
| 3,467,222 | A * | 9/1969 | Gruber | ................... | F16N 25/02 137/271 |
| 3,476,214 | A * | 11/1969 | Callahan | ............ | H02G 15/1813 137/271 |
| 3,666,048 | A * | 5/1972 | Zajaczkowski | ......... | F16N 25/02 184/7.4 |
| 3,783,973 | A * | 1/1974 | Kurten | ................... | F16N 25/02 184/7.4 |
| 3,809,502 | A * | 5/1974 | Henry | ...................... | F15B 3/00 417/349 |
| 3,921,760 | A * | 11/1975 | Brownrigg | ............. | F16N 25/02 184/7.4 |
| 3,995,717 | A * | 12/1976 | Kroffke | ................... | F16N 25/02 184/7.4 |
| 4,044,924 | A * | 8/1977 | Saretzky | ................. | F16N 13/22 184/7.4 |
| 4,105,094 | A * | 8/1978 | Callahan | ................. | F16N 25/02 184/6 |
| 4,180,090 | A * | 12/1979 | Bemba | ................... | F16N 25/02 184/7.4 |
| 4,186,821 | A * | 2/1980 | Wegmann | ............... | F16N 25/02 184/7.4 |
| 4,312,425 | A * | 1/1982 | Snow | ..................... | F16N 25/02 184/7.4 |
| 4,364,452 | A * | 12/1982 | Crago | ..................... | F16N 25/02 184/7.4 |
| 4,365,754 | A * | 12/1982 | Levine | ................... | B05B 12/00 251/63 |
| 4,502,567 | A * | 3/1985 | K/a/rcher | ............... | F16N 25/02 184/7.4 |
| 4,520,902 | A * | 6/1985 | Snow | ..................... | F16N 25/02 184/29 |
| 4,567,912 | A * | 2/1986 | Levine | .................. | B05B 1/3026 239/428 |
| 4,572,331 | A * | 2/1986 | Powell | ..................... | F16N 25/02 184/7.4 |
| 4,609,073 | A * | 9/1986 | Knaebel | ................. | F16N 25/02 417/349 |
| 4,712,649 | A * | 12/1987 | Saam | ..................... | F16N 25/02 137/119.06 |
| 4,714,199 | A * | 12/1987 | Heath | ................... | B05B 7/0483 239/434 |
| 4,921,072 | A * | 5/1990 | Divisi | ..................... | F16N 25/02 137/119.06 |
| 4,951,785 | A * | 8/1990 | Javelly | ................... | F16N 27/00 184/29 |
| 4,972,925 | A * | 11/1990 | Saretzky | ................. | F16N 25/02 184/7.4 |
| 5,002,156 | A * | 3/1991 | Gaunt | ..................... | F16N 13/16 184/7.4 |
| 5,285,871 | A * | 2/1994 | Sievenpiper | ............ | F16N 11/10 184/29 |
| 5,497,852 | A * | 3/1996 | Little | ..................... | F16N 25/02 184/29 |
| 5,632,355 | A * | 5/1997 | Dussault | ................. | F16N 27/00 184/7.4 |
| 7,096,889 | B1 * | 8/2006 | Roys | ................... | F15B 13/0839 184/7.4 |
| 7,735,608 | B2 * | 6/2010 | Paluncic | ................. | F16N 25/02 184/7.4 |
| 8,939,176 | B2 * | 1/2015 | Klaphake | ............... | F16K 31/363 184/7.4 |
| 9,127,808 | B2 * | 9/2015 | Divisi | ..................... | F16N 25/02 |
| 9,151,444 | B2 * | 10/2015 | Powell | ..................... | F16N 25/02 |
| 11,098,848 | B2 * | 8/2021 | Divisi | ..................... | F16N 29/00 |
| 11,435,028 | B2 * | 9/2022 | Conley | ................... | F16N 13/16 |
| 11,639,770 | B2 * | 5/2023 | Hess | ..................... | F16N 25/04 184/7.4 |
| 2002/0144865 | A1 * | 10/2002 | Clancy | ..................... | F16N 7/32 184/55.1 |
| 2005/0163626 | A1 * | 7/2005 | Paluncic | ................. | F16N 25/02 417/244 |
| 2007/0029140 | A1 * | 2/2007 | Smigelski | ............... | F16N 25/02 184/81 |
| 2007/0122295 | A1 * | 5/2007 | Divisi | ..................... | G01F 11/04 417/392 |
| 2009/0308692 | A1 * | 12/2009 | Sattelberger | ........... | B25D 17/26 184/29 |
| 2010/0101672 | A1 * | 4/2010 | Roys | ..................... | F16N 25/02 137/884 |
| 2012/0134847 | A1 * | 5/2012 | Conley | ................... | F16N 29/02 417/15 |
| 2013/0061967 | A1 * | 3/2013 | Klaphake | ............... | F16N 25/02 137/861 |
| 2013/0118835 | A1 * | 5/2013 | Schmitt | ................... | F16N 25/02 184/6 |
| 2014/0090929 | A1 * | 4/2014 | Powell | ................... | F16N 29/04 184/6 |
| 2014/0124073 | A1 * | 5/2014 | Divisi | ..................... | F16K 11/10 137/625.48 |
| 2015/0226376 | A1 * | 8/2015 | Roys | ..................... | F16N 25/00 29/888.021 |
| 2017/0074323 | A1 * | 3/2017 | Kreutzkaemper | ...... | F16C 43/04 |
| 2017/0261009 | A1 * | 9/2017 | Paulessen | ............. | A01B 76/00 |
| 2019/0032647 | A1 * | 1/2019 | Bredbeck | ........... | F04B 39/0022 |
| 2019/0195423 | A1 * | 6/2019 | Edler | ...................... | F16N 7/38 |
| 2020/0318658 | A1 * | 10/2020 | Hess | ..................... | F04B 9/105 |
| 2021/0317949 | A1 * | 10/2021 | Hess | ..................... | F16N 27/00 |
| 2022/0107053 | A1 * | 4/2022 | Hess | ..................... | F16N 25/02 |

\* cited by examiner

Fig. 2

PROGRESSIVE DISTRIBUTOR

CROSS-REFERENCE TO RELATED APPLICATIONS

This application claims priority to and is a 371 National Stage of PCT Application No. PCT/EP2022/053503, filed Feb. 14, 2022, which claims priority to German Application No. 102021104272.0, filed Feb. 23, 2021, the entireties of which are hereby incorporated by reference.

FIELD

The present invention relates to a progressive distributor for lubricant.

BACKGROUND

A progressive distributor or a progressive lubricant system serves to divide a lubricant provided by a pump into a plurality of parts and to supply a number of lubrication points/consumers with lubricants. An important type of distributor is referred to as a block distributor. In this progressive distributor a steel block (housing) forms the base that is machined and into which pistons are inserted that distribute the lubricant. For this purpose bores are introduced into the housing block, into which bores the metering pistons are inserted, which are in turn supplied with lubricant via a common lubricant inlet bore.

Here each metering piston supplies lubricant via respective outlets to two lubricating points/consumers. Furthermore, the quantity of the lubricant that is metered out by each metering piston is identical for each metering piston and cannot be varied. Progressive distributors require in particular that the metering pistons are successively displaced from a first position into a second position in order to either dispense the lubricant at the lubricant outlet, or to act upon the metering piston with corresponding pressure in order to displace it from a first position into a second position. In other words, a respective metering piston can only move if the metering piston arranged before it in the sequence of the metering pistons has already moved. For this reason connecting bores are provided that connect the last metering piston in the sequence to the first metering piston so that the first metering piston moves back after the last metering piston has moved.

The installation height of the housing block of the progressive distributor is largely responsible for the ability to install and use the progressive distributor. For the function of the progressive distributor, on the one hand a plurality of bores are required in the housing block for piston bores and lubricant outlets, and on the other hand connection options for lines are required, via which the lubricant can be guided to the consumers, with the result that the size of the housing block cannot be reduced arbitrarily. Replacing a lubricant-outlet connection can also be made more difficult if the piston bore and the and the lubricant outlet are located close to each other, since under certain circumstances adjacent lubricant-outlet connections must be removed. This is because due to the proximity of the lubricant outlets to one another, a lubricant-outlet connection surrounded by other screws cannot be easily removed directly, whereby a maintenance expense is increased in the case of a malfunction.

SUMMARY

It is therefore the object of the present invention to provide a progressive distributor that can be designed more compact and makes possible a simpler exchange of a lubricant-outlet connection.

In the following a progressive distributor for lubricant, including a housing block, is proposed, in which the housing block includes a lubricant inlet bore via which lubricant is introducible into the progressive distributor and a plurality of lubricant outlets via which a respective metered amount of lubricant is dispensable to a consumer connected to the respective lubricant outlet. For the dispensing of the metered amount of lubricant, a plurality of metering pistons are provided in the housing, which metering pistons are received in associated piston bores, wherein each piston bore is associated with two lubricant outlets, and the metering piston is displaceable in the piston bore and is configured to alternatively dispense the metered amount at the one or the other lubricant outlet. Furthermore, the piston bores are in fluidic connection with the lubricant inlet bore, and the piston bores are fluidically connected to each other via connecting bores in order to transfer lubricant to the other piston bores. Furthermore, each metering piston can define two ring spaces with the piston bore, which ring spaces are configured as workspaces for the lubricant.

In order to be able to make the housing block compact, and in particular reduce the installation height of the progressive distributor, the piston bore is configured as a through-bore extending through the housing and having at least two regions, wherein the first region is configured to receive the metering piston and the second region is configured as lubricant outlet. The piston bore and the lubricant outlet thereby lie one-atop-the-other in one plane instead of in different planes.

The second region preferably has a larger diameter than the first region. Furthermore, the first region can be provided centrally in the axial direction of the piston bore, and the second region can be provided in the region of a housing-block outer side. This makes it possible to adapt the dimensions of first region to the metering piston and to adapt the dimensions of the second region such that a terminal for a lubricant line can be connected.

The piston bore and the lubricant outlet can advantageously be disposed concentrically with respect to each other. The bore that forms the lubricant outlet and the piston bore can thereby be provided in a particularly space-saving manner. Furthermore, a manufacturing expense for the progressive distributor can be reduced since only one bore instead of two bores is required in order to manufacture a lubricant outlet and a piston bore. In addition, the manufacturing can also thereby be effected on the one hand more quickly and on the other hand more cost-effectively.

According to one preferred embodiment, the piston bore is configured on at least one side as a stepped bore, wherein the first region has a first diameter, and the second region has a second diameter. The at least two regions of the piston bore can thereby be formed using only one drilling process.

Each metering piston is preferably configured such that each piston bore is associated with two lubricant outlet channels, which are each connected to the associated lubricant outlet via an associated bypass bore. The metered lubricant can thereby be guided from the piston bore to the lubricant outlet.

According to a further preferred embodiment, a venting device is provided in the lubricant outlet channel. The venting device can preferably be disposed in the lubricant passageway between the piston bore, in particular the ring space, and the housing outer side. This makes it possible to reliably remove air from the progressive distributor so that a flawless function and high distribution accuracy can be ensured. Since the lubricant outlet channel from the piston bore is directly connected to the workspace, the venting device can be placed adjacent to the metering piston such that it can be vented directly at the metering piston. This also makes it possible to reduce the venting time. The venting device is preferably configured as a check valve. Alternatively or additionally, the venting device can be an element releasably connectable to the housing, but sealing in a fluid-tight manner, that can be released, for example, manually, for the venting.

According to another preferred embodiment, an insert releasably connectable to the housing is insertable into the piston bore, which insert closes the first region of the piston bore in a fluid-tight manner, wherein the insert is simultaneously configured as a lubricant outlet. The side of the piston bore, which side is configured as a stepped bore, is preferably configured as a receptacle for the insert. Furthermore, the insert can, for example, simultaneously function as a piston bore closure and lubricant outlet connection. For example, the insert can be provided with a thread that interacts with a thread in the housing block or the piston bore.

According to a further exemplary embodiment, an O-ring can be provided for sealing against the insert, which O-ring interacts with the insert and the first region of the piston bore in order to seal the first region in a fluid-tight manner. The insert makes it possible to reduce the installation expense, since a single insert can function as lubricant outlet and piston bore closure, whereby the number of closures required is halved. The insert can advantageously include a connecting structure, such as, for example, a plug connection, a snap connection, and/or a screw connection, e.g., a cutting sleeve fitting, via which a lubricant line can be connected to the insert.

In order to reduce the space required for changing the insert, the insert can include a hexagonal recess. Due to the hexagonal recess it is possible to exchange a lubricant outlet insert that is closely surrounded by other outlet inserts, without first having to remove the surrounding inserts. The expense during the exchanging of a lubricant outlet insert is thereby reduced. The insert can preferably include an outer thread on itself that is screwable into an inner thread disposed in the piston bore, in particular using the hexagonal recess. Of course, other connecting possibilities are also possible, such as, for example, a clamp connection or a bayonet closure.

For the axial displacing of the metering piston in the piston bore, two metering spaces are preferably respectively provided at the ends of the piston bore, and the first region of the piston bore defines the metering space together with the insert. Furthermore, a cavity can be provided in the insert. It can thereby be ensured that the metering piston has sufficient space for its stroke.

According to a further preferred embodiment, the bypass bore includes a first section and a second section, where the first section is connected to the lubricant outlet from the piston bore, and the second section is connected to the lubricant outlet via the insert. For example, the first section can extend parallel to the piston bore. The bypass bore makes it possible to guide the metered lubricant to the lubricant outlet via the insert. The insert preferably includes at least one opening that is oriented with respect to the second section of the bypass bore such that the lubricant can be guided from the second section into the insert.

Further advantages and advantageous embodiments are specified in the description, the drawings, and the claims. Here in particular the combinations of features specified in the description and in the drawings are purely exemplary, so that the features can also be present individually or combined in other ways.

BRIEF DESCRIPTION OF THE DRAWINGS

In the following the invention is described in more detail using the exemplary embodiments depicted in the drawings. Here the exemplary embodiments and the combinations shown in the exemplary embodiments are purely exemplary and are not intended to define the scope of the invention. This scope is defined solely by the pending claims.

FIG. 2 shows a sectional view along a second axis, perpendicular to the first axis, through the progressive distributor from FIG. 1;

In the following, identical or functionally equivalent elements are designated by the same reference numbers.

DETAILED DESCRIPTION

Figure 1:
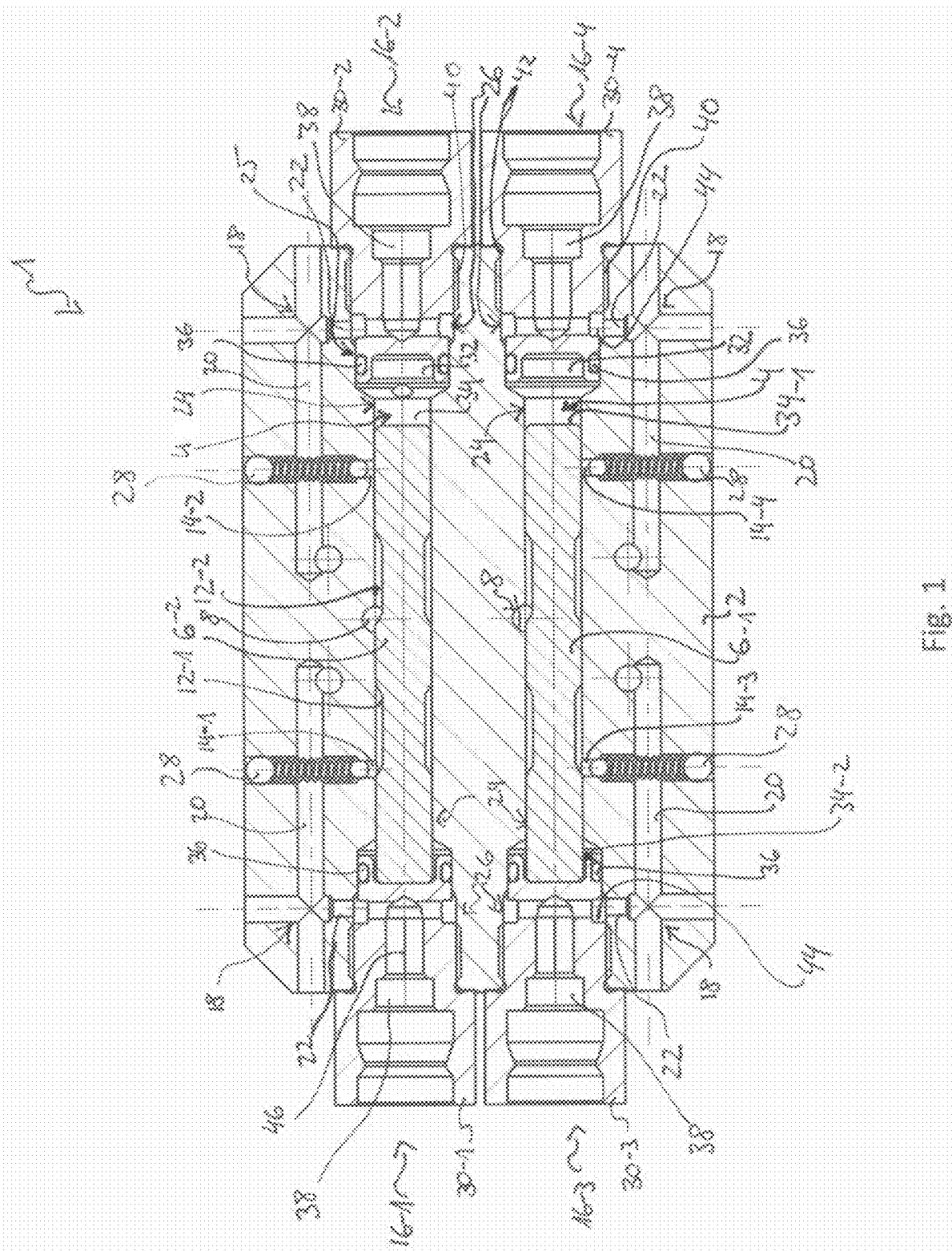
FIG. 1 shows a sectional view along a first axis through a progressive distributor according to one embodiment.
Figure 2:
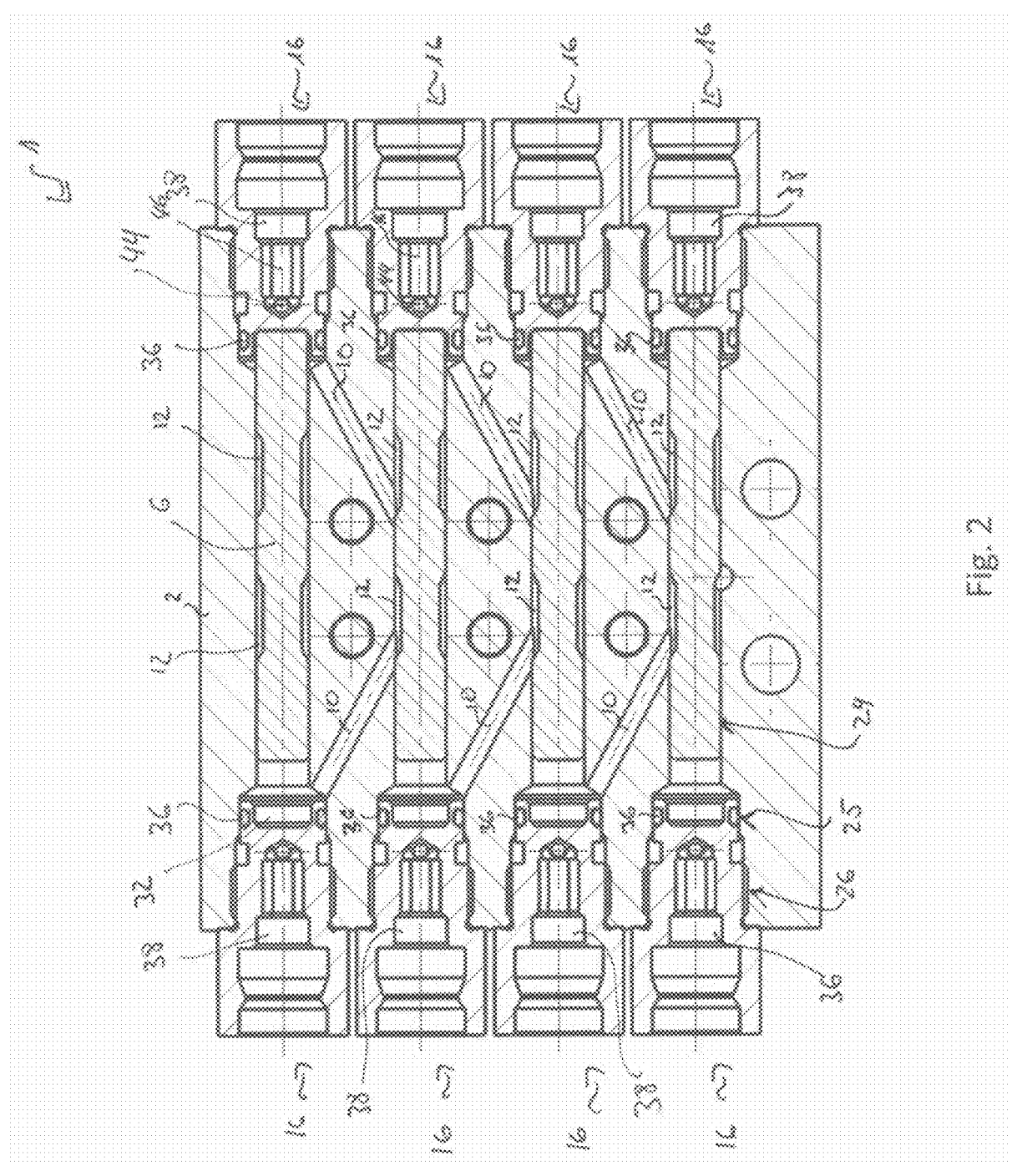

FIG. 1 shows a perspective view of a progressive distributor 1 in block construction. For this purpose the progressive distributor 1 includes a housing block 2 as usual, into which a plurality of bores are introduced. As can be seen from the sectional views of FIGS. 1 and 2, the housing block 2 includes a plurality of piston bores 4 in which metering pistons 6 are receivable. A progressive distributor 1 is based on the fact that the metering pistons 6 are successively displaced from a first position to a second position.

Each metering piston 6 is displaceably disposed in the piston bore 4. In order to provide the lubricant to the individual piston bores 4, a lubricant inlet bore 8 is provided. As can be seen more precisely in FIG. 2, the piston bores 4 are connected to one another via connecting bores 10. Lubricant is guided from one piston bore 4 to the other piston bore 4 via these connecting bores 10.

Furthermore, each metering piston 6 is configured such that it defines two ring spaces with the piston bore 4, which ring spaces are configured as workspaces 12 for the lubricant, and each defines a metering space 34 between each of each of its axial ends and the inner surface of the piston bore 4. As can be seen in FIG. 1, each workspace 12 is provided with a lubricant outlet channel 14 that is uncovered by the alternating movement of the metering piston 6.

In order to be able to design the housing block 2 more compact, and in particular to reduce the installation height of the progressive distributor 1, the piston bore 4 is configured as a through-bore, extending through the housing, including at least two regions 24, 26, wherein the first region 24 is configured to receive the metering piston 4, and the second region is configured as lubricant outlet 16. Here the second region 26 has a larger diameter than the first region 24, wherein the first region 24 and the second region 26, i.e., the piston bore 4 and the lubricant outlet 16, are disposed concentrically with respect to each other.

In order for the lubricant to be guided from the lubricant outlet channel 14 to the lubricant outlet, a bypass bore 18 is associated with each lubricant outlet channel 14. The bypass bore 18 comprises a first section 20 and a second section 22. Here the first section 20 extends parallel to the piston bore 4 and is connected to the lubricant outlet channel 14. The second section 22 connects the first section 20 to a lubricant outlet 16, so that the bypass bore 18 makes it possible to guide the metered lubricant from the lubricant outlet channel 14 to the lubricant outlet 16.

The lubricant flows via the lubricant inlet bore 8 to a metering space 34-1 of the first metering piston 6-1. The metering piston 6-1 is thereby displaced, and the lubricant that is located in the other metering space 34-2 of the metering piston 6-1 is pressed out of the metering space 34-2 and flows, via the connecting line 10 (FIG. 2) disposed at the metering space 34-2, to the workspace 12 of the next metering piston 6, and from there via the lubricant outlet channel 14 and the bypass bore 18 to the lubricant outlet 16.

In particular, as can be seen in FIG. 1, the lubricant outlet channel 14 and the first and second section 20, 22 of the bypass bore 18 can be introduced from outside into the housing block 2. In order to then close the bore channels, for example, closure caps (not depicted), closing in a fluid-tight manner, such as, for example, a ball-sealing or plugging, can be provided that close the bore channels outwardly in a fluid-tight manner.

Furthermore, in the exemplary embodiment depicted, the piston bore 4 is configured as a stepped bore, wherein the first region 24 is formed by a first step, and the second region 26 by a second step. Between the first and the second step, a third step is formed that serves as a transition region 25, having a third diameter, between the first region 24 and the second region 26, wherein the third diameter is larger than the first diameter and is smaller than the second diameter. For manufacturing reasons, the transitions between the different steps can extend obliquely.

An insert 30 that is releasably connectable to the housing block 2 is insertable in the piston bore and closes the first region 24 of the piston bore 4 in a fluid-tight manner, so that the insert 30 is simultaneously configured as lubricant outlet 16. For example, the insert can include an axial bore 46 from which the lubricant can escape. Here the stepped bore of the piston bore 4 is configured as a receptacle for the insert 30. The insert 30 can, for example, simultaneously function as a piston-bore closure and lubricant-outlet connection. Furthermore, the insert 30 in the depicted exemplary embodiment includes a cavity 32 that defines a metering space 34 together with the piston bore 4, so that it is ensured that the metering piston 6 has sufficient space for its stroke. Furthermore, an O-ring 36 is provided for sealing against the insert 30, which O-ring 36 interacts with the transition region 25 of the piston bore 4 in order to seal the first region 24, and in particular the metering space 34, in a fluid-tight manner. Here it is important that the transition region 25 have a smaller diameter than the second region 26, which second region 26 corresponds to the inner diameter of the thread 40. Only thus can an O-ring 36 be chosen that can be inserted without damage by the thread 40. Furthermore, the slopes in front of it can serve as insertion slopes for the O-ring 36. Of course, other seals are also possible.

In the embodiment shown, the insert 30 is provided on its outer side with a thread that engages in a thread 40 disposed on the second region 26 of the piston bore. Alternatively or additionally, the insert 30 can also be configured to be secured in the second region 26 using another releasable attachment method. The insert 30 makes it possible to reduce the installation expense, since a single insert 30 serves as lubricant outlet 16 and piston-bore closure, whereby the number of closures required is halved. Furthermore, a seal edge 42 is provided that is disposed on the outer side and is configured to interact with the insert 30 in order to seal the insert 30 against the housing block 2.

In order to reduce the space requirement for the changing of the insert 30, the insert includes a hexagonal recess 38, using which the insert 30 can be screwed into the thread 40 of the second region 26. Due to the hexagonal recess 38 of the insert 30, it is possible to exchange an insert 30 that is tightly surrounded by other outlet inserts without first having to remove the surrounding inserts. The expense during the exchanging of a lubricant-outlet insert is thereby reduced.

The insert 30 is preferably configured such that a lubricant line (not shown) is connectable to it. For example, the lubricant line can be attached to the insert via a releasable connection, such as, for example, a snap closure, a latch closure, or a cutting sleeve fitting. The insert 30 further includes an opening 44 configured as a ring space, which opening 44 interacts with the second section 22 of the bypass bore 18 such that the lubricant can be guided from the bypass bore 18 through the radial bore 46 of the insert 30 to the lubricant outlet 16.

As furthermore shown in FIG. 1, in the lubricant outlet channel 14 between the ring space 1 and the housing outer side, a check valve 28 configured as venting device is provided. The check valve 28 makes it possible to remove air from the progressive distributor 1 so that a flawless function and high distribution accuracy can be ensured. Since the lubricant outlet channel 14 is directly connected to the workspace 12, the check valve 28 can be placed adjacent to the metering piston 6, whereby it can be vented adjacent to the metering piston 6, which can reduce the venting time. Alternatively or in addition to the check valve 28, an element releasably connectable to the housing 2, but sealing in a fluid-tight manner, for example, a screw, can be provided that can be released for venting, for example, manually.

Overall, with the presented progressive distributor 1 there is the ability to design the housing block more compact, and in particular design an installation height lower. Furthermore, the manufacturing expense can be reduced by the concurrent assembly of piston bore 4 and bore for the lubricant outlet 16. Due to the use of screw connections 38 having hexagonal recesses for the attaching of the lubricant-outlet insert 30, it is additionally made possible to exchange an insert without the adjacent inserts having to be released.

REFERENCE NUMBER LIST

1 Progressive distributor
2 Housing block
4 Piston bore
6 Metering piston
10 Connecting bore
12 Workspace
14 Lubricant outlet channel
16 Lubricant outlet
18 Bypass bore
20 First section
22 Second section
24 First region
25 Transition region
26 Second region
30 Insert
32 Cavity
34 Metering space
36 O-ring
38 Screw connection
40 Thread
42 Seal edge
44 Opening
46 Axial bore

The invention claimed is:

1. A progressive distributor for lubricant comprising:
a housing block including a lubricant inlet bore, via which lubricant is introducible into the progressive distributor, and a plurality of lubricant outlets, via which a metered amount of lubricant is dispensable to a consumer connected to the respective lubricant outlet, a plurality of piston bores, and a plurality of connecting bores, each piston bore being associated with two lubricant outlets of the plurality of lubricant outlets, the piston bores being fluidically connected to the lubricant-inlet bore, the piston bores being fluidically connected to each other via the connecting bores in order to transfer lubricant to the other piston bores, each piston bore being a through-bore extending through the housing block; and
a plurality of metering pistons disposed in the housing block and configured for dispensing metered amount of lubricant, each metering pistons being received in an associated piston bore of the plurality of piston bores, each metering piston being displaceable in the associated piston bore and being configured to alternatingly dispense the metered amount of lubricant to the one or the other lubricant outlet;
wherein each piston bore includes a first region configured to receive the respective metering piston and a second region configured as one of the two lubricant outlets associated with the respective piston bore.

2. The progressive distributor according to claim 1, wherein the piston bore and the lubricant outlet are disposed concentrically with respect to each other.

3. The progressive distributor according to claim 1, wherein the piston bore is configured on at least one side as a stepped bore, wherein the first region has a first diameter, and the second region has a second diameter.

4. The progressive distributor according to claim 1, wherein each piston bore is associated with two lubricant outlet channels, the lubricant outlet channels being respectively connected to the associated lubricant outlet via an associated bypass bore.

5. The progressive distributor according to claim 4, further comprising a venting device in the lubricant outlet channel.

6. The progressive distributor according to claim 5, wherein the venting device comprises a check valve.

7. The progressive distributor according to claim 1, further comprising an insert releasably connectable to the housing block and insertable into the piston bore, the insert closing the first region of the piston bore in a fluid-tight manner when connected to the housing block, the insert being configured as one of the lubricant outlets associated with the piston bore the insert is inserted into.

8. The progressive distributor according to claim 7, wherein for the axial displacing of the metering piston in the piston bore two metering spaces are respectively provided at the ends of the piston bore, and the first region of the piston bore defines the metering space together with the insert.

9. The progressive distributor according to claim 7, wherein the bypass bore includes a first section and a second section, wherein the first section is connected to the lubricant outlet channel and the second section is connected to the lubricant outlet via the insert.

10. The progressive distributor according to claim 7, wherein the insert includes a hexagonal recess screw.

11. The progressive distributor according to claim 8, wherein the bypass bore includes a first section and a second section, wherein the first section is connected to the lubricant outlet channel and the second section is connected to the lubricant outlet via the insert.

12. The progressive distributor according to claim 11, wherein the insert includes a hexagonal recess screw.

13. The progressive distributor according to claim 2, wherein the piston bore is configured on at least one side as a stepped bore, wherein the first region has a first diameter, and the second region has a second diameter.

14. The progressive distributor according to claim 13, wherein each piston bore is associated with two lubricant outlet channels, the lubricant outlet channels being respectively connected to the associated lubricant outlet via an associated bypass bore.

15. The progressive distributor according to claim 14, further comprising a venting device in the lubricant outlet channel.

16. The progressive distributor according to claim 15, wherein the venting device comprises a check valve.

17. The progressive distributor according to claim 16, further comprising an insert releasably connectable to the housing block and insertable into the piston bore, the insert closing the first region of the piston bore in a fluid-tight manner when connected to the housing block, the insert being configured as one of the lubricant outlets associated with the piston bore the insert is inserted into.

18. The progressive distributor according to claim 1, wherein said two lubricant outlets associated with each piston bore are disposed axially outboard of opposite ends of the metering piston associated with the respective piston bore.

19. The progressive distributor according to claim 1, wherein the second region of each piston bore is not configured to receive the respective metering piston associated with the respective piston bore.

* * * * *